United States Patent
Takikawa et al.

(10) Patent No.: US 10,409,449 B2
(45) Date of Patent: Sep. 10, 2019

(54) IN-VEHICLE DISPLAY APPARATUS AND CONTROLLING PROGRAM

(71) Applicant: DENSO CORPORATION, Kariya, Aichi-pref. (JP)

(72) Inventors: Hiroya Takikawa, Kariya (JP); Takeshi Kawashima, Nisshin (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 491 days.

(21) Appl. No.: 14/101,703

(22) Filed: Dec. 10, 2013

(65) Prior Publication Data

US 2014/0165005 A1   Jun. 12, 2014

(30) Foreign Application Priority Data

Dec. 12, 2012 (JP) ................. 2012-271463

(51) Int. Cl.
*B60K 35/00* (2006.01)
*B60K 37/06* (2006.01)
(Continued)

(52) U.S. Cl.
CPC .......... *G06F 3/04817* (2013.01); *B60K 35/00* (2013.01); *B60K 37/06* (2013.01);
(Continued)

(58) Field of Classification Search
CPC ...... H04W 8/24; G06F 17/00; G06F 3/04817; G06F 3/0489; G06F 3/0482; B60K 35/00; B60K 37/06; B60K 2350/928
(Continued)

(56) References Cited

U.S. PATENT DOCUMENTS 6,141,003 A    10/2000   Chor et al.
6,476,794 B1 *  11/2002   Kataoka ............. B60H 1/00985
                                                      200/5 A
(Continued)

FOREIGN PATENT DOCUMENTS

JP    11-032272     2/1999
JP    2003-531046   10/2003
(Continued)

*Primary Examiner* — Amy M Levy
(74) *Attorney, Agent, or Firm* — Harness, Dickey & Pierce, P.L.C.

(57) ABSTRACT

An in-vehicle display apparatus includes a control unit for executing a selected application feature for controlling a control object device. The selected application feature may be one of a plurality of application features that is selected by a driver by using switches on a portion of a vehicle steering wheel. The in-vehicle display apparatus displays output contents of the application feature in a main display area together with vehicle information. When no operation is performed for controlling the application feature for a predetermined period of time, or when the driver selects another application feature, the control unit executes the application feature that is currently running in a background, treating it as a background (BG) application feature, and displays a BG icon for a BG application feature associated switch that is operable for an operation of the BG application feature that is currently running in the background.

14 Claims, 6 Drawing Sheets

(51) Int. Cl.
  *G06F 3/038*   (2013.01)
  *G06F 3/0481*  (2013.01)
  *G06F 3/0489*  (2013.01)
  *G06F 3/0482*  (2013.01)

(52) U.S. Cl.
  CPC ............ *G06F 3/038* (2013.01); *G06F 3/0482* (2013.01); *G06F 3/0489* (2013.01); *B60K 2350/928* (2013.01); *G06F 2203/04803* (2013.01)

(58) Field of Classification Search
  USPC .......................................................... 701/36
  See application file for complete search history.

(56) References Cited

U.S. PATENT DOCUMENTS

| | | | | |
|---|---|---|---|---|
| 6,650,345 | B1* | 11/2003 | Saito | B60K 37/06 345/173 |
| 6,903,652 | B2* | 6/2005 | Noguchi | B60R 11/02 340/425.5 |
| 7,693,631 | B2* | 4/2010 | Yukawa | G06F 3/0482 345/156 |
| 8,188,972 | B1* | 5/2012 | Krenz | G06F 3/0482 345/156 |
| 2003/0023353 | A1* | 1/2003 | Badarneh | B60K 35/00 701/1 |
| 2004/0122564 | A1* | 6/2004 | Ogasawara | G01C 21/26 701/1 |
| 2004/0122572 | A1* | 6/2004 | Ichinose | B60K 35/00 701/36 |
| 2004/0138795 | A1* | 7/2004 | Alkarawi | G06F 3/0238 701/36 |
| 2005/0096812 | A1* | 5/2005 | Nezu | G01C 21/3664 701/36 |
| 2006/0155441 | A1* | 7/2006 | Berg | B60K 35/00 701/41 |
| 2007/0052545 | A1* | 3/2007 | Le Gallic | B60K 35/00 340/815.4 |
| 2008/0175359 | A1* | 7/2008 | Karmazyn | G06F 3/0238 379/93.01 |
| 2009/0076676 | A1* | 3/2009 | Yamamoto | G06F 3/016 701/31.4 |
| 2010/0302018 | A1* | 12/2010 | Tuzar | B60K 37/02 340/425.5 |
| 2011/0309925 | A1 | 12/2011 | Ishibashi et al. | |
| 2012/0179325 | A1* | 7/2012 | Faenger | B60K 35/00 701/31.4 |
| 2012/0245945 | A1 | 9/2012 | Miyauchi et al. | |
| 2012/0260164 | A1* | 10/2012 | Scheufler | B60K 35/00 715/702 |
| 2013/0030644 | A1* | 1/2013 | Kemmerer | H04N 21/41422 701/36 |
| 2013/0142019 | A1* | 6/2013 | Itou | G11B 31/003 369/7 |
| 2013/0166146 | A1* | 6/2013 | Tanaka | G06F 3/0488 701/36 |
| 2013/0190978 | A1* | 7/2013 | Kato | G01C 21/3664 701/36 |
| 2013/0204459 | A1* | 8/2013 | Enami | B60K 37/06 701/1 |
| 2013/0298052 | A1* | 11/2013 | Nara | G01C 21/3629 715/764 |
| 2013/0316707 | A1* | 11/2013 | Azuma | H04W 60/00 455/435.1 |
| 2014/0297674 | A1* | 10/2014 | Rhee | G06F 3/167 707/758 |
| 2015/0208194 | A1* | 7/2015 | Ito | H04W 4/046 455/41.2 |

FOREIGN PATENT DOCUMENTS

| | | |
|---|---|---|
| JP | 2005-313722 | 11/2005 |
| JP | 2006-264615 | 10/2006 |
| JP | 2012-001109 | 1/2012 |
| JP | 2012-144225 | 8/2012 |
| JP | 2012-162117 | 8/2012 |
| JP | 2012-213132 | 11/2012 |

* cited by examiner

IN-VEHICLE DISPLAY APPARATUS AND CONTROLLING PROGRAM

CROSS REFERENCE TO RELATED APPLICATION

The present application is based on and claims the benefit of priority of Japanese Patent Application No. 2012-271463, filed on Dec. 12, 2012, the disclosure of which is incorporated herein by reference.

FIELD OF THE INVENTION

The present disclosure generally relates to an in-vehicle display apparatus and method for displaying an output from a currently-running application feature.

BACKGROUND INFORMATION

Generally, an in-vehicle display apparatus may have a plurality of switches disposed on a portion of a steering wheel that allows a driver to control in-vehicle devices and/or connected portable terminals. In-vehicle devices may include vehicle electrical components such as an audio/video or an air-conditioning device. Connected portable terminals may include mobile devices such as a cellular phone or a smart phone that are brought into a vehicle. The plurality of switches on the steering wheel may be used to input instructions and to display an output from the in-vehicle display apparatus. More specifically, a driver may execute a function of an application feature of the in-vehicle device by inputting an instruction input from the plurality of switches of the in-vehicle display apparatus. For example, the driver may use the plurality of switches to input an instruction into the in-vehicle display apparatus in order to execute a fast-forward function or a rewind function of a music track provided by a music player of an audio/visual device, or execute a cabin temperature adjustment provided by a temperature control feature of an air-conditioning device, and the like. In turn, an outputted result of the application feature may be transferred back to the in-vehicle display apparatus and the contents of the processing result may be displayed on the in-vehicle display apparatus together with vehicle information representing a vehicle state.

As such, the in-vehicle display apparatus allows the driver to operate the electrical component and/or the portable terminal while driving since the driver may simultaneously view the outputted results of the application feature that is executed by inputting a function control from the switches of the in-vehicle display apparatus, which are then displayed on the in-vehicle display apparatus together with the vehicle information. Therefore, the driver may safely and efficiently operate electrical components and/or portable terminals while driving.

Such an in-vehicle display apparatus has many "direct switches" disposed on a portion of the steering wheel, as described in a patent document D1 (i.e., Japanese Patent Laid-Open No. 2006-264615). The direct switches are associated with the application features of the target electrical component or portable terminal, which may result in the same number of switches and applications. That is, the electrical component and/or the portable terminal may be a "control object device" that is controlled by an operation of the direct switches that are disposed on the steering wheel.

Providing direct switches on a portion of the steering wheel is convenient for the driver since an on-screen menu may be displayed to allow a driver to select a menu item. For example, the driver may select an icon/button of a desired application feature from among similar-appearing icons/buttons in a selection menu. However, as a result of an increased number of the available applications and functions, too many direct switches may make it difficult for the driver to quickly find the desired switch. In addition, it may be difficult to physically fit all of the direct switches on the steering wheel.

Having too many direct switches may be avoided (i) by using the switches in a shared manner among many application features that are associated with many target devices. For example, switch integration that may assign one set of up/down switches to many sets of similar function controls, such as up/down controls for both cabin temperature control and audio volume level control. Further, switch integration may provide the driver with the freedom of choice, by allowing the driver to customize on-screen menus to reduce the number of on-screen menu items which are associated with the desired application feature of the target device. That is, the number of direct switches may be reduced for the convenience of the driver.

With such an in-vehicle display apparatus, an output from a currently running application feature may preferably be set to a non-display status. As a result, the currently running application feature may be sent to a "background" when (i) the currently running application feature has not received an input operation from the driver for a predetermined period of time, or (ii) another application feature is selected and executed by the driver. In such manner, the vehicle information as well as the output contents of the newly-selected application feature may be easily recognized by the driver of the vehicle.

However, with such an in-vehicle display apparatus, if the driver would like to bring the currently running application feature from the background to the foreground in order to perform an input operation for such program, the driver must bring up the currently running application feature by performing a menu item selection operation. That is, the driver can bring the application feature to the foreground only after selecting one or more of the on-screen menu items corresponding to the background application feature, which may be cumbersome for the driver of the vehicle.

SUMMARY

It is an object of the present disclosure to provide an in-vehicle display apparatus and method for providing improved operability of an application feature that is running in the background.

In an aspect of the present disclosure, an in-vehicle display apparatus is connected to a plurality of switches disposed on a steering wheel of a vehicle for an operation of a control object device by a driver. The in-vehicle display apparatus designates at least one of an electrical component that is installed in the vehicle or a portable terminal that is brought into the vehicle as the control object device. The in-vehicle display apparatus includes a display unit having a main display area that displays vehicle information representing a vehicle state. The in-vehicle display apparatus also includes a control unit that instructs the control object device to execute an application feature when the application feature is selected from a plurality of application features by the driver using the plurality of switches, and to display output contents of the application feature in the main display area of the display unit together with the vehicle information. When no operation is performed to control the application feature for a predetermined period of time, or when the driver selects an other application feature, the control unit is configured to (i) designate the application feature as a BG application feature, and (ii) display a BG icon for an identification and an operation of a BG application feature associated switch that is operable to execute an operation of the BG application feature. The display of the BG icon by the control unit is performed in a sub-display area (4b) that is an area separated from the main display area, and the display of the BG icon substitutes the display of the output contents of the BG application feature in the main display area.

More specifically, the control unit is configured to operate in the following manner. That is, the control unit in the in-vehicle display apparatus executes, when one of a plurality of application features is selected by the driver by using the above-described plurality of switches, the selected application feature in one of the control object devices (i.e., controls a relevant control object device to execute the selected application feature), and displays the output contents of the currently running application feature in the main display area of the display unit together with the above-mentioned vehicle information.

Further, in the present disclosure, when no operation is performed for controlling the currently running application feature for a predetermined period of time, or when the driver selects the other application feature, the control unit is configured to execute the currently running application feature in a background, treating it as a background application feature, and displays a BG icon, for an identifying the BG icon and an operation of a switch associated with the BG application feature (i.e., a BG process switch hereinafter) that may be pushed or operated for an operation or a control of the BG application feature, which is currently running in the background. In the above-described circumstance, the control unit displays the BG icon in a sub-display area instead of displaying it in the main display area. That is, the control unit uses the sub-display area that is disposed as a different and separate area from the main display area to display the BG icon, instead of displaying the output contents of the BG application feature.

In such a configuration, when no operation is performed for controlling the currently running application feature for a predetermined period of time, or when the driver selects the other application feature, an application feature is executed in the background with a non-display status of the output contents from such currently running application feature. Therefore, the vehicle information and/or the output contents from the other application feature are easily visible and recognizable by the vehicle driver.

Further, by the display of an icon (i.e., the BG icon) in the sub-display area of the display unit, the BG process switch is more easily identified by the driver. Therefore, when the driver attempts to execute a BG application feature associated operation, the driver can easily and intuitively recognize which one of the plurality of switches he/she should operate.

Therefore, according to the present disclosure, an operability of a application feature currently running in the background is improved without utilizing a direct switch. In the present disclosure, the sub-display area of the display unit may be provided in the main display area, or may be provided outside of the main display area.

Further, in the present disclosure, when the driver pushes or operates a switch corresponding to the BG icon, the control unit may display the output contents of the BG application feature in the main display area. In such a configuration, the output contents from the application feature currently running in the background are displayed in the main display area by a single operation of the driver.

Additionally, in such a case, the control unit may display in advance in the sub-display area a first guidance that shows how (i.e., the method or manner) the switch corresponding to the BG icon should be pushed or operated, together with the BG icon. For example, depending on a situation, the method or manner for operating a switch may vary, such as a simple push (i.e., a pushing of a switch for a short period of time), a long push, a double push (i.e., a double click) and the like. However, by the display of the first guidance, the type of push of the switch allows the driver to bring the background-executed application feature to a foreground in a way that is easily and securely recognized by the vehicle driver. Further, a certain switch corresponding to a displayed BG icon may not only be pushed or operated in a method or manner shown in the first guidance, but may also be pushed or operated in an alternative manner, which is different from the manner shown in the first guidance (e.g. a long push or a double push if the first guidance is a simple push). In such a case, the alternative manner of pushing or operating such switch may be used to control and operate an application feature that is being displayed in the main display area, instead of controlling and operating the BG application feature.

Also, in the present disclosure, when the driver pushes a switch corresponding to a BG icon, the control unit may execute, from among the plurality of BG application features, a relevant function of the application feature that realizes a function corresponding to the pushed or operated switch by controlling the control object device. In other words, when a switch corresponding to the BG icon is pushed or operated by the driver, the control unit executes a function of the application feature, from among a plurality of BG application features, which is an function corresponding to the switch. In such a configuration, a specific function which is provided by an application feature currently running in the background is realized by a single switch operation by the driver.

Additionally, in such a case, the control unit may display in advance in the sub-display area a second guidance that shows or indicates a function of the application feature that is realized by a push or operation of the switch corresponding to the BG icon, together with that BG icon. For example, such a function may be a fast-forward function and a rewind function of a music track playback by an audio/visual device, an audio volume adjustment function of the same, a cabin temperature control function of an air-conditioner, and the like. However, by displaying the second guidance, recognizing the function of the BG icon when pushing or operating the BG icon is easily and securely recognized by the vehicle driver.

Further, the control unit may use or employ a "vacant" switch, as a BG icon switch corresponding to the BG icon. The "vacant" switch may be a switch to which no application feature associated function is assigned when the driver selects the other application feature as described above. In other words, when the other application feature does not employ or implement such a switch for inputting a function to itself, the "vacant" switch in idle may still be used by other application features, which may be the BG application feature. In such a configuration, when such vacant switch is pushed or operated, the push of the vacant switch will not be mistaken as an function or a control of the application feature being displayed in the main display area in view of the BG application feature, thereby making it easy for the driver to perform a multitask process.

BRIEF DESCRIPTION OF THE DRAWINGS

Objects, features, and advantages of the present disclosure will become more apparent from the following detailed description made with reference to the accompanying drawings, in which.

DETAILED DESCRIPTION

An embodiment of the present disclosure is described with reference to the drawings.

First, an in-vehicle network system 2 that includes an in-vehicle display apparatus 1 of the present embodiment is explained.

Figure 1:
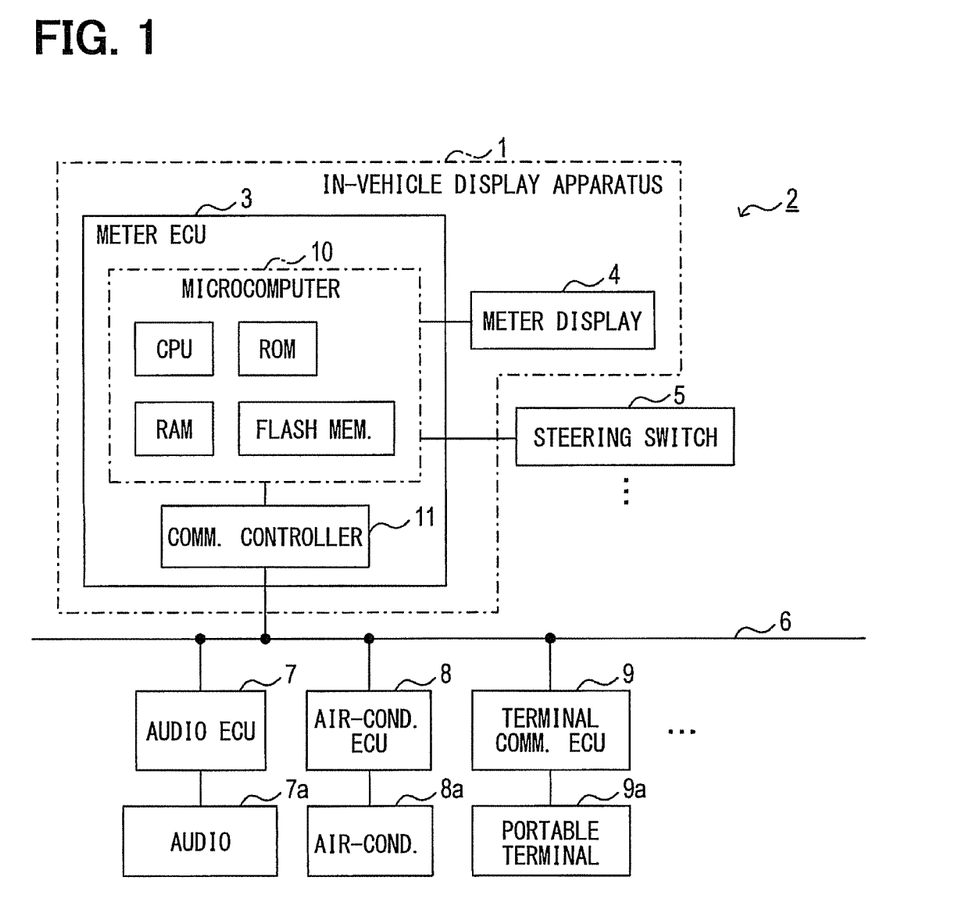
FIG. 1 is a block diagram of an overall configuration of an in-vehicle network system including an in-vehicle display apparatus.

As shown in FIG. 1, the in-vehicle display apparatus 1 uses, among other in-vehicle ECUs on the in-vehicle network system 2, a meter ECU 3 which performs a display control of a meter display 4 in a subject vehicle as its main component. More specifically, the in-vehicle display apparatus 1 includes the meter ECU 3, which may be a control unit in the claims, and the meter display 4, which may be a display area in the claims, and is connected to plural steering switches 5 which may be a plurality of switches in the claims.

The meter ECU 3 includes a microcomputer 10, which has a CPU, ROM, RAM, and a flash memory. More specifically, the ECU 3 is provided with the microcomputer 10 and a communication controller 11.

The communication controller 11 performs data communications via the communication bus 6 with other ECUs which constitute the in-vehicle network system 2. According to a predetermined protocol (for example, a well-known CAN protocol), the communication controller 11 transmits data generated by the microcomputer 10 via the communication bus 6, or receives the data via the communication bus 6 from other ECUs which is supplied to the microcomputer 10.

Other ECUs constituting the in-vehicle network system 2 may also be configured to have the microcomputer and the communication controller, just like the meter ECU 3. Other ECUs may be provided as ECUs for controlling electrical components, such as an audio ECU 7 which controls an audio equipment 7a, an air-conditioner ECU 8 which controls an air-conditioner 8a, and a terminal communication ECU 9 which controls a portable terminal 9a carried by the driver and brought into the vehicle.

Specifically, the audio ECU 7 performs each of the following application features about a selection of the user-desired contents of the user, e.g., a driver, a playback of such contents, an adjustment of a audio volume, a fast-forward and a rewind of a music piece/video (i.e., sound/image data), and the like. The air-conditioner ECU 8 performs each of the following application features for selecting a heating/cooling mode, switching ON/OFF of the air-conditioning, adjusting of temperature and the like. The terminal communication ECU 9 performs, in cooperation with a smart phone etc., each of the following application features about a transmission and a reception of a telephone call or a mail, a browsing of homepages on the Internet, providing navigation, and the like.

These ECUs 7-9 perform, in cooperation with the meter ECU 3, each of the application features by performing data communications with the meter ECU 3 via the communication bus 6. More specifically, control data which specifically identifies an application feature selected by the vehicle driver using a steering switch 5 may be transmitted from the meter ECU 3 to ECUs 7-9 via the communication bus 6, and the ECUs 7-9 may perform the application feature according to an operation by the driver based on this control data.

Therefore, the in-vehicle display apparatus 1 treats (i) the electrical components such as the audio equipment 7a, the air-conditioner 8a, and (II) the portable terminals 9a such as a cellular phone and a smart phone, as a control object device controlled by the steering switch 5. Further, in the present embodiment, the control data representative of the output contents from the application features that are performed by the ECUs 7-9 is transmitted from the ECUs 7-9 to the meter ECU 3 via the communication bus 6, and the meter ECU 3 displays an image on the meter display 4 based on such control data.

An application feature may be defined as a process that is performed by the CPU based on an application software stored in ROM or a flash memory in the microcomputer in each of the ECUs 7-9, for a control of the control object device assigned to each of those ECUs 7-9. Further, two or more application software products is assigned to the respective control object devices in advance, which are software products equipped with a function that is desired by the user to be realized in an inside of the vehicle compartment.

<Configuration of a Steering Switch and a Meter Display>

Next, a configuration of a steering switch and a meter display is explained.

Figure 2A:
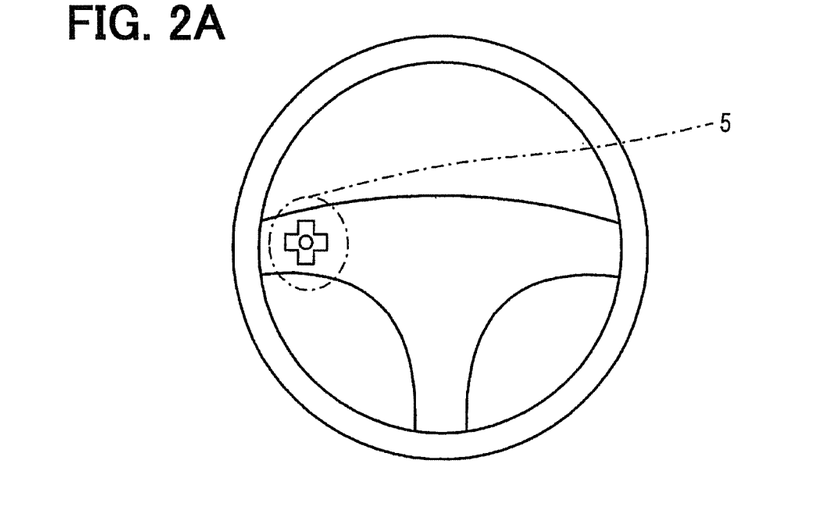
FIGS. 2A, 2B, and 2C are illustrations of a switch configuration and display part configurations.

As shown in FIG. 2A, plural steering switches 5 are disposed at a position on a steering spoke adjacent to a wheel portion of the steering wheel, and, a cross-shape key on a left spoke includes an up switch, a down switch, a right switch and a left switch together with a center switch that is positioned at a center of the cross-shape key. The cross-shape key may be on the right spoke of the steering wheel, or may be on both of the right and left spokes of the steering wheel.

Among these switches, the center switch may be used to bring up a menu screen that is mentioned later. The configuration of the steering switch 5 is not limited to the above, as long as it is installed on the steering wheel of the vehicle. That is, for example, the switches 5 may be installed on a wheel portion of the steering wheel instead of a spoke part, and may have different number of switches and/or a different shape.

The meter display 4 is a display unit installed in a frame of a dashboard that is immediately in front of a driver's seat of the vehicle, for displaying the vehicle information representative of a vehicle state, such as a vehicle speed, an engine rotation number, and a remaining amount of the fuel. The control data representing such vehicle information is transmitted from various ECUs (e.g., an engine ECU, a brake ECU, etc.) which perform a drive train control of the vehicle (not illustrated) to the meter ECU 3 via the communication bus 6. The meter ECU 3 is configured to display an image based on the transmitted control data on the meter display 4.

Figure 2B:
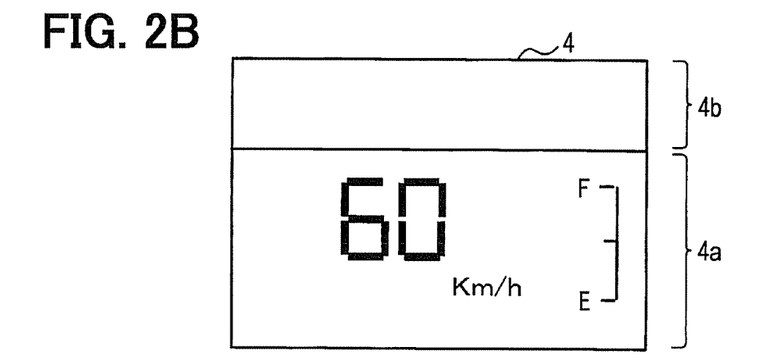
Figure 2C:
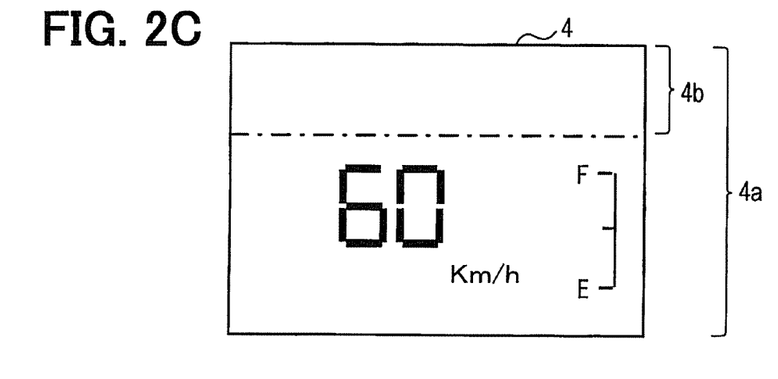

A display screen of the meter display 4 includes, as shown in FIGS. 2B and 2C, a main display area 4a which displays the above-mentioned vehicle information at least and a sub-display area 4b that is disposed as the other area other than the main display area 4a. The main display area 4a and the sub-display area 4b may be pre-fixed areas (see FIG. 2B), or the sub-display area 4b may exist in the main display area 4a (see FIG. 2C) allowing a part of the main display area 4a to be used as the sub-display area 4b as required.

<Control Process of the Meter ECU>

Next, a control process in the microcomputer 10 of the meter ECU 3, which is performed by CPU that uses a program stored in the ROM or the flash memory and uses the RAM as a work area, is explained.

Figure 3:
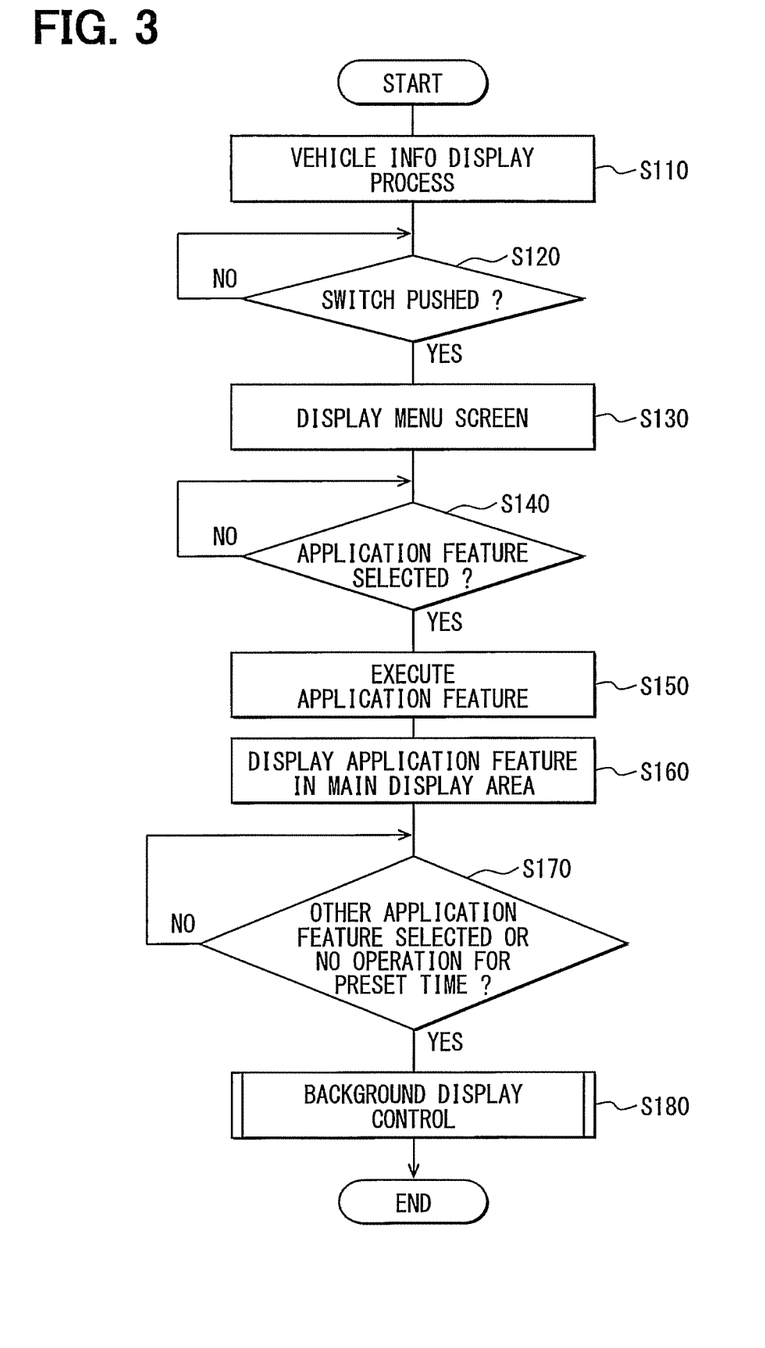
FIG. 3 is a flowchart of a control process in the in-vehicle display apparatus.

As shown in FIG. 3, when an ignition switch of the vehicle is turned on, the microcomputer 10 starts a vehicle information display process which displays, in the main display area 4a of the meter display 4, a vehicle information image based on the vehicle information received via the communication controller 11 from the communication bus 6 (S110).

Figure 4A:
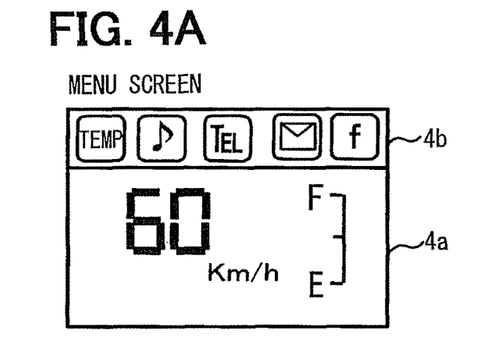
FIGS. 4A, 4B, 4C, 4D, 4E, and 4F are illustrations of a display screen in various guidance situations.

Then, the microcomputer 10 determines whether a push operation of the center switch from among the steering switches 5 is performed (S120). When such a push operation is detected (S120:YES), the microcomputer 10 displays, in the sub-display area 4b of the meter display 4, the menu screen (see FIG. 4A) in which an operation menu that allows the driver to select one of the above-mentioned plural application features (S130). On the other hand, when such a push operation is not detected (S120:NO), the microcomputer 10 just waits (i.e., repeating S120), displaying nothing in the sub-display area 4b.

On the menu screen, a cursor moves according to an instruction operation of the right/left switch of the cross-shape key, i.e., the steering switch 5, and, upon having a push operation of the center switch which is provided as an independent button, an application feature corresponding to a cursor-pointed menu icon at the moment of a push operation is performed by the control object device.

More specifically, the microcomputer 10 determines whether the application feature is selected by the driver by using the steering switch 5 (S140), and, when such selection is detected (S140:YES), the microcomputer 10 sends the control data onto the communication bus 6 via the communication controller 11, for the relevant control object device to execute the selected application feature (S150). On the other hand, when not detecting a selection of an application feature (S140:NO), the microcomputer 10 waits with the sub-display area 4b put in a display state that keeps displaying the menu screen.

Then, after the control data that is sent out onto the communication bus 6 is picked up by the relevant ECU (i.e., one of ECUs 7-9), the relevant ECU receiving the control data executes the application feature according to the driver's operation based on the received control data, and the relevant ECU sends out the control data onto the communication bus 6, by which the output contents from the currently running application feature are represented.

Figure 4B:
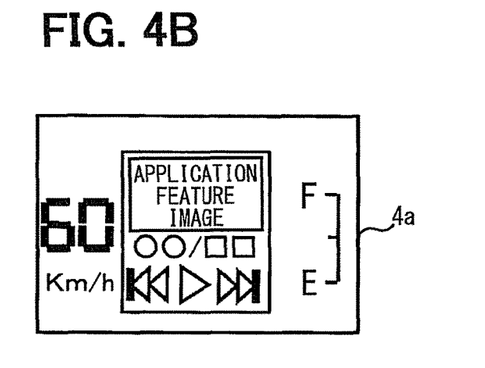

Therefore, the microcomputer 10 receives such control data (i.e., the control data by which the output contents from the currently running application feature are represented) via the communication controller 11 from the communication bus 6, and displays an application image (see FIG. 4B) based on the control data in the main display area 4a of the meter display 4 (S160). When the application image is displayed in the main display area 4a, a display position of the vehicle information image is moved from the center to one side (e.g., to a left side) of the main display area 4a by the microcomputer 10.

Then, the microcomputer 10 determines whether a trigger to proceed to a next step is detected, which is (i) a selection of the other application feature by the driver using the steering switch 5, or (ii) an absence of an operation by the driver using the steering switch 5 (i.e., an absence of a switch operation associated with the currently running application feature) for a predetermined period of time (S170). When such a trigger is detected (S170:YES), a background display control process mentioned later is started (S180), and, when such a trigger is not detected (S170:NO), the microcomputer 10 just waits with the main display area 4a put in a display state that displays the application image together with the vehicle information image.

<Background Display Control Process>

Next, the background display control process which is performed by the microcomputer 10 of the meter ECU 3 is explained.

Figure 5:
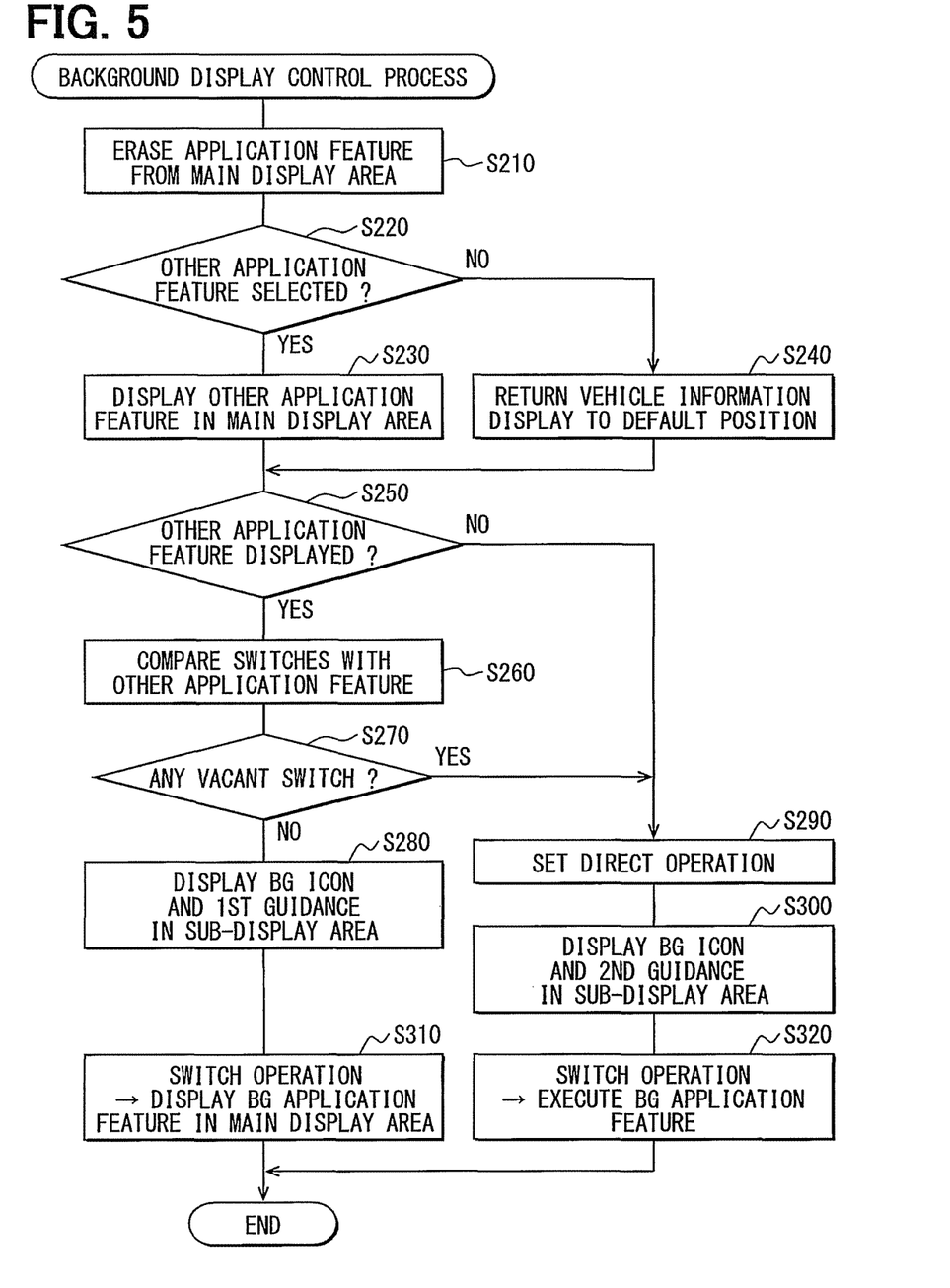
FIG. 5 is a flowchart of a background display control process in the in-vehicle display apparatus.

As shown in FIG. 5, when the background display control process is started, the microcomputer 10 erases the application image currently displayed in the main display area 4a of the meter display 4 (S210). In the following, an application feature regarding the erased application image erased from the main display area 4a is designated as a BG application feature that is currently running in the background.

Then, the microcomputer 10 determines whether the detected trigger that is detected in S170 is a selection of the other application feature by the driver using the steering switch 5 (S220). When it is determined as such a trigger (S220:YES), the microcomputer 10 performs the selected application feature selected in S170 in the relevant control object device, and displays the output contents from such application feature (i.e., an application image) in the main display area 4a together with the vehicle information image (S230). On the other hand, when the detected trigger is determined as an absence of an operation by the driver using the steering switch 5 for a predetermined period of time (S220:NO), the microcomputer 10 returns a display position of the vehicle information image from one side of the main display area 4a to the center, i.e., to a default position (S240).

Then, the microcomputer 10 determines whether the other application image is displayed in the main display area 4a of the meter display 4 (S250). If it is determined that such an image is being displayed (S250:YES*), a switch used by a real-time (RT) application feature, which is currently being displayed in the main display area 4a in real time is compared with a switch used by the above-mentioned BG application feature (S260). More specifically, whether an operation on each of the up/down/right/left switch is used to operate/control the RT application feature and the BG application feature is examined. On the other hand, when the other application image is not being displayed (S250:NO), a direct operation is set up (S290). A direct operation is described in detail further below.

Then, the microcomputer 10 determines, in the above-described other image displayed case (S250:YES), whether there is one or more steering switches 5, which are usable/available to operate/control the BG application feature and have no assignment of an operation regarding the RT application feature (270). That is, it is determined whether a "vacant" switch having no assignment of a control of a function of an RT application feature, which may be, for example, an air-conditioner application feature using only the up/down switches for a temperature setting/adjustment function, is found for the BG application feature, e.g., a music playback application feature attempting to use such vacant switches, such as, the right/left switches in this case, for operating a fast-forward/rewind function.

If it is determined that any vacant switch exists (S270: YES), the microcomputer 10 reads a priority of each of the operation contents regarding the BG application feature. In this case, regarding the switches used by various operations of each of the application features and the priority of each of the operation contents of those application features, a table in the ROM or the flash memory is used to memorize such information.

Figure 4C:
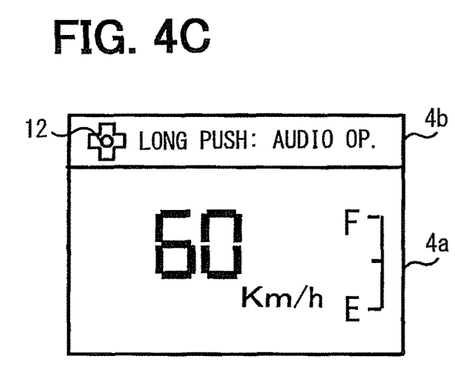
Figure 4D:
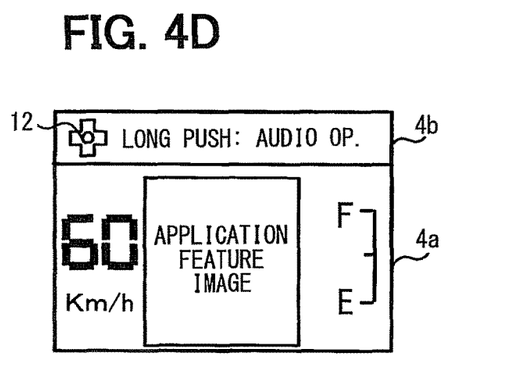

On the other hand, when it is determined that no vacant switch exists (S270:NO), an icon 12 (henceforth a "BG icon" 12) for identifying a switch (i.e., one of the steering switches 5) by which a switch operation of the BG application feature is performable is displayed in the sub-display area 4b of the meter display 4 (S280). Further, a first guidance that shows how a switch corresponding to the BG icon 12 should be pushed is displayed in the sub-display area 4b of the meter display 4 together with the BG icon 12 (S280). As for the first guidance, as shown in FIGS. 4C and 4D, a long push of the center switch, is displayed in the sub-display area 4b together with a name of an audio operation, which identifies a control object device corresponding to the BG application feature, for example.

Figure 6:
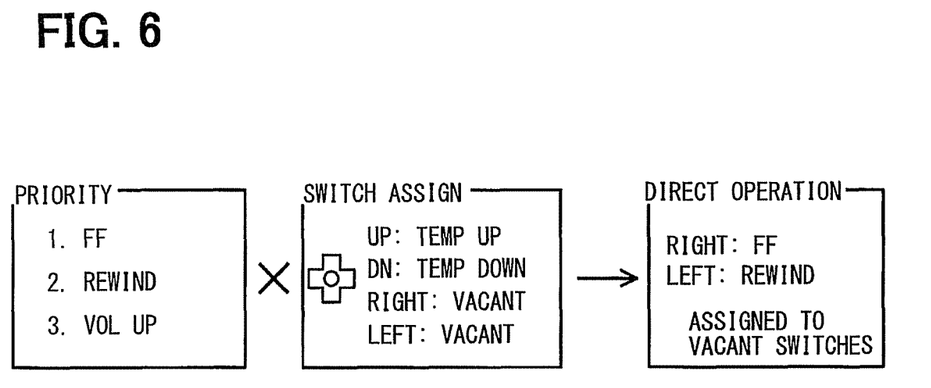
FIG. 6 is an illustration of a switch setting for a background (BG) icon.

On the other hand, when it is determined that a vacant switch exists (270:YES), as shown in FIG. 6, high priority operations assignable to the vacant switches are set as direct operations to available vacant switches (S290). For example, as briefly described in the above, when the RT application feature is a process regarding an air-conditioner 8a operation and the BG application feature is a process regarding an audio equipment 7a operation, the right/left switch of the cross-shape key are not used (i.e., vacant) for a control of a function of the air-conditioner 8a while the up/down switches of the cross-shape key are used (i.e., occupied) for the cabin temperature control of the air-conditioner 8a from among the steering switches 5. Therefore, the fast-forward/ rewind of a music piece in the audio equipment 7a, which are high priority operations and assignable to the right/left switches, are set up as direct operations of those vacant switches for the BG application feature.

Further, when S290 is reached from S250, which is a NO determination branch from S250 (i.e., when no application image is being displayed in the main display area 4a of the meter display 4), high priority operations of the BG application feature are set up as the direct operations, regardless of the availability of the vacant switches.

Figure 4E:
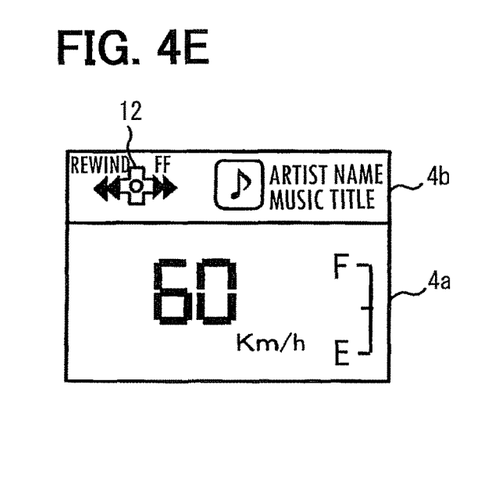
Figure 4F:
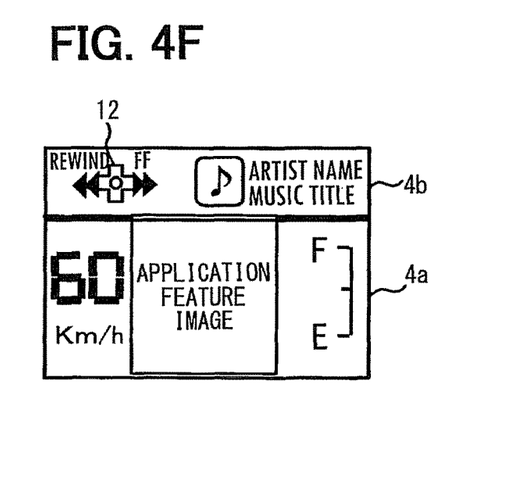

Then, the microcomputer 10 displays, together with the BG icon 12, a second guidance showing the direct operations set in S290 (i.e., functions to be realized by a push of the switch corresponding to the BG icon 12) in the sub-display area 4b of the meter display 4 (S300). As for the second guidance, as shown in FIGS. 4E and 4F, a rewind/ fast-forward of music tracks in a currently-played music medium (e.g., a CD) may be displayed in the sub-display area 4b together with a currently-played music title and the like in the audio equipment 7a, for example.

Further, the microcomputer 10 performs a display process for displaying the output contents from the BG application feature (i.e., the application image) in the main display area 4a of the meter display 4 by replacing the BG application feature with the RT application feature, when the switch corresponding to the BG icon 12 is pushed by a manner shown in the first guidance (S310). Furthermore, when the BG icon 12 currently displayed with the second guidance is pushed, the microcomputer 10 executes an application feature in the relevant control object device by controlling one of the control object devices, for realizing a function corresponding to each of the switches of the BG icon 12 (S320).

<Effects>

As explained above, the microcomputer 10 in the in-vehicle display apparatus 1 performs or executes the relevant electric device. The application feature is selected from among many application features by the switch operation of the vehicle driver performed on the steering switches 5, and the output contents are displayed from the currently running application feature in the main display area 4a of the meter display 4 together with the vehicle information.

Then, when no operation is performed (i.e., detected/ observed) for controlling the currently running application feature for a predetermined period of time, or when the driver selects the other application feature, the control unit puts the currently running application feature in a background as a BG application feature, which is still currently running in the background, and displays a BG icon that shows a switch operable to control/operate the BG application feature, in a sub-display area 4b that is disposed, or appears on demand, as a different area from the main display area to display the BG icon, instead of displaying the output contents from the BG application feature in the main display area 4a.

In such manner, when no operation is performed (i.e., detected and/or observed) for controlling the currently running application feature for a predetermined period of time, or when the driver selects the other application feature, an application feature is executed in the background with a non-display status of the output contents from such currently running application feature. Therefore, the vehicle information and/or the output contents from the other application feature are easily visible and recognizable by the vehicle driver.

Further, by the display of an icon (i.e., the BG icon 12) in the sub-display area 4b of the meter display 4, the BG process switch becomes more easily identifiable and accessible for the driver. Therefore, when the driver attempts to perform a BG application feature associated operation, the driver can easily and intuitively recognize which one of the plural switches he/she should operate.

Therefore, according to the in-vehicle display apparatus 1, the operability of the currently running application feature in the background is improved, without utilizing a direct switch.

Further, in the in-vehicle display apparatus 1, when the driver pushes or operates a switch corresponding to the BG icon 12 that is displayed together with the first guidance, the microcomputer 10 displays the output contents from the BG application feature in the main display area 4a. Therefore, the output contents from the currently running application feature in the background are displayed in the main display area 4a by a single operation of the driver.

Further, when the driver pushes or operates a switch corresponding to the BG icon 12 that is displayed together with the second guidance, the microcomputer 10 may execute, from among a plurality of application features, a process that enables an application feature associated to the pushed or operated switch by controlling the control object device. Therefore, a specific function which is possessed by a currently running application feature in the background is realized by a single operation of the driver.

Further, in the in-vehicle display apparatus 1, when the other application feature is selected by the driver, the switch not used for operating/controlling the other application feature (i.e., the vacant switch) is set up as a direct operation switch with which the driver is enabled to perform a direct operation of the BG application feature. Therefore, when such vacant switch which is already assigned to the BG icon is pushed, the push of the vacant switch will not be mistaken as an operation or a control of the application feature being displayed in the main display area 4*a* in view of the BG application feature, thereby making it easy for the driver to perform a multitask process.

In the in-vehicle display apparatus 1, when setting up the switch with which the direct operation of the BG application feature is enabled, the direct operation to be assigned to such switch is picked up according to the preset priorities of respective application features. Therefore, a frequently-used operation of the BG application feature is automatically selected for the benefit of the user convenience and/or the improved operability.

Further, except for a time when there is no vacant switch in the in-vehicle display apparatus 1, the direct operation of the BG application feature is set up to the vacant switch. Such a scheme greatly saves time and efforts of the user who would otherwise have to "dig" through the menu and display the output contents of the BG application feature in the main display area 4*a*.

Other Embodiments

Although the present disclosure has been fully described in connection with preferred embodiment thereof with reference to the accompanying drawings, it is to be noted that various changes and modifications will become apparent to those skilled in the art.

For example, the background display control process in the above-mentioned embodiment is a situation where only one BG application feature is executed. However, the present disclosure is not necessarily limited to such a configuration. That is, if a trigger such as a no-operation of the steering switch 5 for a predetermined time is detected during an execution time of the RT application feature, another BG icon 12 may additionally be displayed in the sub-display area 4*b* for the executing such an RT application feature as another BG application feature, for example.

Further, when the center switch of the steering switch 5 is pushed during the execution time of the BG application feature, about which the description of the background display control process in the above-mentioned embodiment is silent in fact, the menu screen may be displayed in the sub-display area 4*b* together with the BG icon 12, for example.

Further, S310 of the background display control process in the above-mentioned embodiment, in which a push of the switch corresponding to the BG icon 12 in a manner shown in the first guidance leads to the display of the output contents from the BG application feature in the main display area 4*a*, may be modified to the other form.

That is, for example, in case of such push of the switch, the process may transit to S290, and may display, in the sub-display area 4*b* of the meter display 4, the second guidance showing the direct operation. Further, in such case, the process in S290 may set up all high-priority operations regarding the BG application feature as the direct operations of the steering switches 5 regardless of the availability of the vacant switch.

Such a scheme of assigning the direct operations regarding the BG application feature to all steering switches 5 may be beneficial for the user when, for example, the user would like to output and display "output contents", such as a "map" in this case, from a navigation application in the main display area 4*a*, which the navigation application demands very few user operations/inputs as a foreground application feature once a destination is set. That is, when the direct operations of the BG application feature associated with an audio device are assigned to the right/left/up/down switches of the cross-shape key on the steering wheel, user-desired functions of the audio device such as fast-forward/rewind/volume-up/volume-down regarding the music playback are readily available and accessible by the user with reference to the second guidance in the sub-display area 4*b*, while executing the application feature associated to the audio device in the background.

Further, the background display control process in the above-mentioned embodiment branches into two cases depending on conditions, that is, one for displaying the first guidance in the sub-display area 4*b* (i.e., when the direct operation is improper), and the other for displaying the second guidance in the sub-display area 4*b* (i.e., when the direct operation is proper). However, such a branch scheme may be modified. That is, regardless of the conditions, one of two guidances may uniformly be displayed in the sub-display area 4*b*. Further, when at least the BG icon 12 is displayed in the sub-display area 4*b*, display of these guidances may be omitted, stopped, or made optional.

Further, the in-vehicle display apparatus in the above-mentioned embodiment is illustrated as controlling the audio equipment 7*a*, the air-conditioner 8*a*, and the portable terminal 9*a*, which respectively serve as the control object device. However, other electrical components and/or other portable terminals other than the smart phone and cellular phones may also serve as the control object device of the in-vehicle display apparatus of the present disclosure.

Such changes, modifications, and summarized schemes are to be understood as being within the scope of the present disclosure as defined by appended claims.

What is claimed is:

1. An in-vehicle display controlling apparatus comprising:
a control unit mounted within a vehicle and having a memory and a processor configured to
control a display unit having a main display area and a sub display area, the main display area configured to display vehicle information representing a vehicle state of the vehicle and to display output generated by execution of application features of a control object device of a plurality of control object devices that include an in-vehicle device and a portable terminal brought into the vehicle,
receive user input from a plurality of switches, the plurality of switches being operated by a driver of the vehicle,
generate output to control the control object device based on the user input from the plurality of switches,
instruct the control object device to execute an application feature in response to the application feature being selected from a plurality of application features by the user input,
control the display unit to display output contents generated by execution of the application feature by the control object device in the main display area of the display unit together with the vehicle information, wherein in response to no operation being performed to control the application feature for a predetermined period of time, and in response to another application feature being selected, the processor of the control unit is further configured to (i) designate the application feature as a background (BG) application feature that is being executed in a background, (ii) display in the sub-display area of the display unit a BG icon that identifies the BG application feature, and (iii) display in the sub-display area a guidance display that illustrates a BG application feature associated switch of the plurality of switches that is operable to generate output to execute an operation of the BG application feature, in response to the another application feature being selected, assigning at least one operation of the another application feature to at least one of the plurality of switches, the processor of the control unit is further configured to determine whether a vacant switch without a corresponding operation assignment exists from among the plurality of switches, and in response to the processor of the control unit determining that the vacant switch exists, the processor of the control unit is further configured to read a priority of operation contents associated with the BG application feature, and to assign a highest priority operation content to the vacant switch, and in response to the processor of the control unit determining that the vacant switch does not exist, the processor of the control unit is further configured to not assign operation contents of the BG application feature to any of the switches of the plurality of switches.

2. The in-vehicle display controlling apparatus according to claim 1, wherein
the control unit displays the output contents of the BG application feature in the main display area in response to the BG application feature associated switch being operated.

3. The in-vehicle display controlling apparatus according to claim 2, wherein
the guidance displayed by the control unit in the sub-display area is a first guidance that indicates a method for operating the BG application feature associated switch.

4. The in-vehicle display controlling apparatus according to claim 3, wherein
in response to determining that the vacant switch is unavailable, the BG icon and the first guidance are displayed in the sub-display area.

5. The in-vehicle display controlling apparatus according to claim 1, wherein
the guidance displayed by the control unit in the sub-display area is a second guidance that indicates a function of the BG application feature that is realized when the BG application feature associated switch is operated.

6. The in-vehicle display controlling apparatus according to claim 1, wherein
the vacant switch is configured to control the assigned highest priority operation content as a direct operation.

7. The in-vehicle display controlling apparatus according to claim 1, wherein the vehicle information is at least one of: a vehicle speed, an engine rpm, and a vehicle fuel level.

8. The in-vehicle display controlling apparatus according to claim 1, wherein in response to the control unit determining that there is no vacant switch available, the control unit is further configured to display in the sub-display area a guidance indicating how to display the BG application feature in the main display area.

9. A method for controlling a control object device of a plurality of control object devices that include an in-vehicle device and a portable terminal that is brought into a vehicle and displaying a control of the control object device with an in-vehicle display apparatus of the vehicle, the in-vehicle display apparatus having a display unit and a plurality of switches, the method comprising:

designating at least one of the in-vehicle device that is installed in the vehicle or the portable terminal that is brought into the vehicle as the control object device;

executing an application feature of the control object device in response to the application feature being selected from a plurality of application features, which are assigned to one or more of the control object devices;

instructing the in-vehicle display apparatus to display output contents of the in-execution application feature in a main display area of the display unit together with vehicle information;

executing the in-execution application feature as a background (BG) application feature in response to (i) no operation being performed to control the in-execution application feature for a predetermined period of time, or (ii) another application feature being selected;

instructing the in-vehicle display apparatus to display in a sub-display area of the display unit a background (BG) icon and a guidance associated with the BG application feature;

in response to the other application being selected, assigning one or more operations of the other application feature to one or more of the plurality of switches;

determining whether a vacant switch from among the plurality of switches exists after the other application feature is selected and after assigning the one or more operations to the one or more of the plurality of switches;

in response to determining that the vacant switch exists, reading a priority of operation contents associated with the BG application feature, and assigning a highest priority operation content to the vacant switch, and in response to determining that the vacant switch does not exist, not assigning operation contents of the BG application feature to any of the switches of the plurality of switches.

10. The method according to claim 9, wherein the vacant switch is a switch that is not used by the other application feature.

11. The method according to claim 9, wherein
the vacant switch is configured to control the assigned highest priority operation content as a direct operation.

12. The method according to claim 9, further comprising displaying in the sub-display area a guidance indicating how to display the BG application feature in the main display area in response to determining that there is no vacant switch available.

13. An in-vehicle network system for controlling a control object device of a plurality of control object devices, the plurality of control object devices including an in-vehicle device and a portable terminal brought into a vehicle, the in-vehicle network system comprising:

an electronic control unit (ECU) of a plurality of electronic control units of the vehicle configured to execute an application for controlling the control object device;

a display having a main display area and a sub-display area, the main display area configured to display vehicle information and output contents of the application; and a plurality of switches configured to provide a control signal to a microcomputer for controlling the in-vehicle device, wherein in response to the application being initially executed, the microcomputer runs the application as a foreground application and displays the output contents of the foreground application in the main display area concurrently with the vehicle information, and wherein in response to no control signal input being received by the ECU for a predetermined period of time, the microcomputer transitions the foreground application to a background application, and assigns one or more operations of another foreground application to one or more of the plurality of switches;

in response to the foreground application transitioning to the background application, and to there being a vacant switch among the plurality of switches, the microcomputer determines a priority of the background application, designates the vacant switch as a background application switch to provide a control signal input to the background application based on the priority of the background application, removes the output contents of the foreground application from the main display area, displays an icon indicative of the background application in the sub-display area, and displays a guidance near the icon indicating which of the plurality of switches is the background application switch, and wherein in response to the foreground application transitioning to the background application, and to there being no vacant switch among the plurality of switches, none of the plurality of switches are designated by the microcomputer as the background application switch.

14. The in-vehicle network system according to claim 13, wherein in response to there being no vacant switch available among the plurality of switches, the microcomputer is configured to display in the sub-display area a guidance indicating how to display the background application in the main display area.

* * * * *